UNITED STATES PATENT OFFICE.

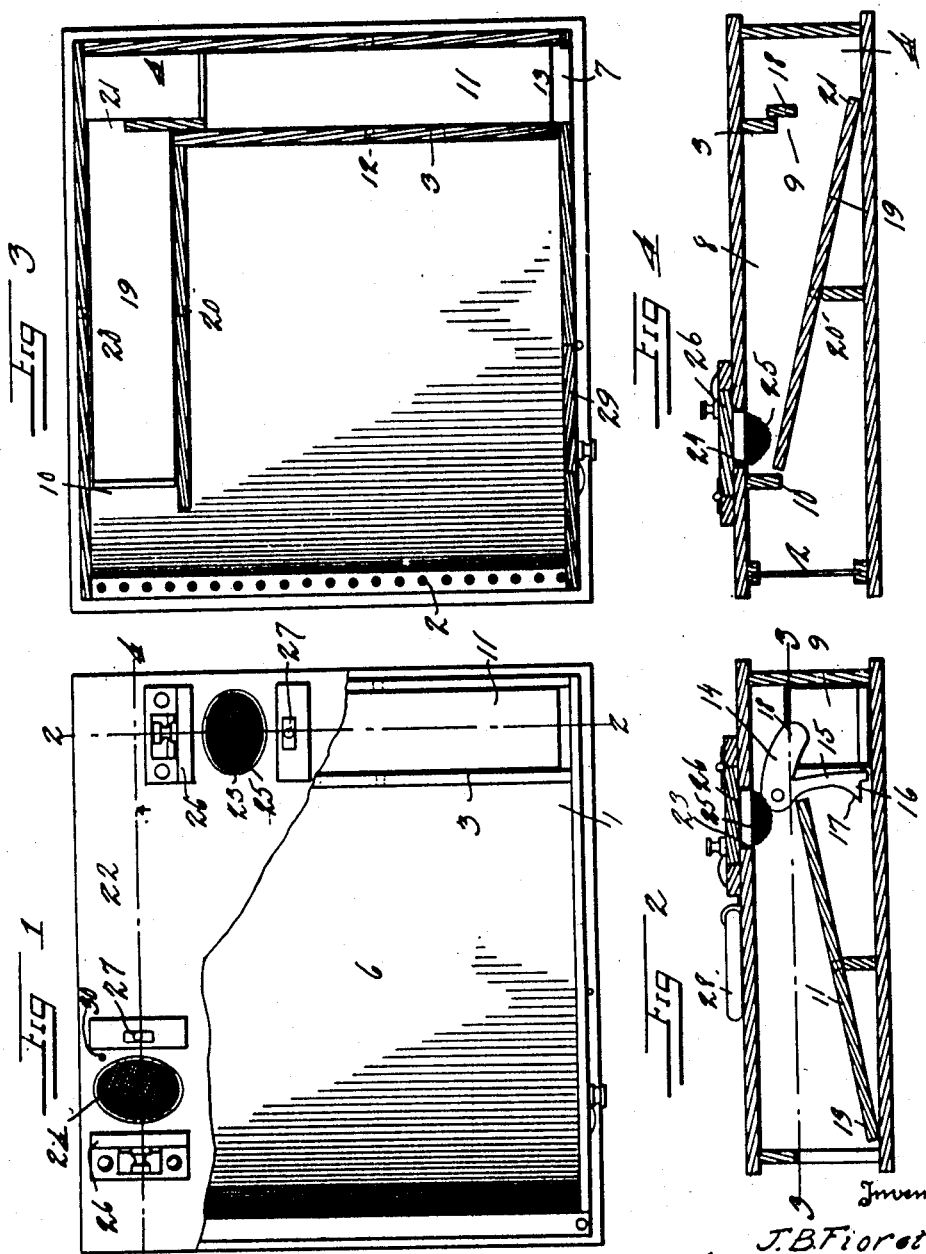

JOHN B. FIORETTA, OF NEW YORK, N. Y.

ANIMAL-TRAP.

1,203,997.　　　　　Specification of Letters Patent.　　Patented Nov. 7, 1916.

Application filed June 2, 1916. Serial No. 101,406.

*To all whom it may concern:*

Be it known that I, JOHN B. FIORETTA, a citizen of the United States, residing at New York city, in the county of New York, State of New York, have invented certain new and useful Improvements in Animal-Traps; and I do hereby declare the following to be a full, clear, and exact description of the invention, such as will enable others skilled in the art to which it appertains to make and use the same.

This invention relates to animal traps, and has particular reference to a trap for catching mice or rats.

The object of the invention is to provide a practical device for entrapping animals in numbers, that is, one which will be automatically reset after an animal has been caught. In operating a trap of this type, I have arranged the various parts in such coöperative relation that the action which entraps one animal and positively locks the entrance-way against return, also resets the mechanism for the entrance of the next animal.

Thus, more particularly, my invention consists in the construction of a trap in which an inclosure or pound is given entrance through a series of passages in which rocking treadways are tipped by the animal passing thereover in succession, the first treadway being locked in the tipped position and released from the tipped position by the action of the succeeding treadway, so that an animal which has passed over the first treadway will not be permitted to return thereover and escape but must continue over the next treadway to find its way into the pound in order to escape from the passage.

With the above object and others in view, which will hereinafter appear, my invention will be fully set forth and described, referring to the accompanying drawings.

In the drawings:—Figure 1 is a plan view of the device having the cover partly broken away. Fig. 2 is a section on line 2—2 of Fig. 1. Fig. 3 is a section on line 3—3 of Fig. 2, and Fig. 4 is a section on line 4—4 of Fig. 1.

Referring more particularly to said drawings, 1 represents a cage or housing, preferably rectangular in plan view, and which may have one or more of its walls barred as indicated at 2 to provide a cage-like structure. Preferably, the device is constructed wholly of metallic sheet material, but obviously may be constructed of wood or suitable material. The housing 1 is provided at one end with a partition 3 which extends entirely across the structure and provides a passageway 4. Leading transversely from the opposite face of the partition 3 and extending across the housing to a point short of the barred side 2, is a partition 5, the partitions 3 and 5 providing an inclosure or pound 6. At one end, the passageway 4 is provided with an opening 7 which forms the entrance to the passageway. At its opposite end the passageway 4 connects with the passageway 8 formed by the partition 5 through an opening 9, formed in the partition 3. The opening 9 does not extend entirely to the top of the cage, but terminates in the partition 3 at a short distance above the top. The opposite end of the passageway 8 communicates by a similar opening 10 with the pound 6. Within the passageway 4 is mounted a tilting treadway 11, which consists of an elongated strip extending from the entrance 7 to the point adjacent the opening 9, the width of the strip being such that there is just enough clearance upon either side for the treadway to freely rock in the passageway. The treadway 11 is provided with trunnions upon opposite sides which have bearings in the adjacent wall of the housing and in the partition 3, the trunnions 12 being so disposed that the distance between the trunnions and the end 13 of the treadway is of just sufficiently greater length than the distance between the trunnions 12 and the opposite end of the treadway to cause the end 13 to remain lowered under ordinary conditions. Mounted upon the side of the partition 3 and overhanging the inner end of the treadway 11 is a latch 14. Said latch is pivoted near the upper edge of the partition 3, and consists of a depending shank 15 which carries the lug 16, said lug being adapted to engage over the end of the treadway 11 when the latter is depressed. The upper face of the lug 16 is beveled as at 17 so that the end of the treadway 11 will ride thereover, swinging the shank 15 to one side until the end of the treadway has passed under the lug 16. The upper end of the latch 14 is enlarged into an elongated weight 18 which overhangs the door 9 and extends a short distance below the upper edge of the latter, for the purpose which will hereinafter appear.

The passageway 8 is wholly occupied by a treadway 19, which is mounted upon the trunnions 20, having bearings in the partition 5 and the adjacent wall of the housing. The end 21 of the treadway 19 extends through the doorway 9, and is adapted to strike below the weighted end 18 of the latch 14 when said end 21 is elevated, the action being such that when the weight 18 is elevated, the lug 16 is removed from the end of the treadway 11, so that the latter may assume its normal position, that is with the heavy end 13 depressed opposite the entrance doorway 7. The end 21 of the treadway is heavier than the opposite end, so that said end 21 is normally the lower one of the treadway.

The cover section 22 is provided with two apertures 23 and 24, which appear respectively above the normally elevated ends of the treadways 11 and 19. Within each aperture is fitted a basket 25 of suitably meshed material, in which bait is to be placed in order to attract the animals into the cage. Lids 26 hinged to the apertures and adapted to be secured by turn buttons 27 give access to the baskets through the top of the cover 22 and permit the baskets to be secured against molestation from the outside. A handle 28 secured to the top of the cover provides a means for transporting the device, and a door 29 in one of the walls of the cage provides a means for removing therefrom the captured animals.

In the operation of my device, the device is set by placing a food of different character in each of the baskets 25. As above stated, the ends 13 and 21 of the treadways 11 and 19 respectively are depressed when the device is ready for the entrance of an animal. The animal enters the passageway 4 through the opening 7, and mounts the treadway 11 to secure the food from the basket 25 which overhangs the elevated end of the treadway. After passing the trunnioned portion of the treadway, the upper end of the latter is depressed by the weight of the animal, until it is locked below the lug 16 of the latch 14. The end 13 is thus elevated above the level of the door 7, and the animal is prevented from retracing its steps. The only means of egress from the passageway 4, therefore, is through the doorway 9 and up the inclined treadway 19 at the upper end of which is located the other basket 25 containing the different kind of food. The animal making its way up the treadway 19 overbalances the latter in due time and is forced to make his way through the passageway 10, the heavier end 21 of the treadway 19 striking against the weighted end 18 of the latch 14 when the treadway 19 is overbalanced, so that the lug 16 is lifted from engagement with the treadway 11 which then assumes its normal position with the weighted end 13 lowered in front of the doorway 7. This action not only resets the treadway 11 for the entrance of the next animal, but eliminates any possibility of the entrapped animal making its way backwardly through the doorway 9 and the passage 4. At a point adjacent the opening 24, and over the elevated end of the treadway 19 is a small opening 30, through which a hat-pin or other suitable instrument may be inserted to depress the treadway so that its opposite end may lift the latch 14 to release the treadway 11 in cases when the latter has been accidentally locked.

What I claim as my invention is:—

An animal trap comprising in combination, a pound inclosure, passageways giving access to said inclosure, a plurality of treadways pivoted in said passageways to rock longitudinally therein, said treadways having their forward ends weighted to assume normally depressed positions, means for locking the first treadway in the opposite position when an animal has passed thereover, said locking means consisting of a latch element adapted to engage over the first treadway and an angular weighted arm extended into the pathway of the second treadway to be lifted to free the first treadway, and bait holding means above the normally elevated end of each treadway.

In testimony whereof, I affix my signature, in the presence of two witnesses.

JOHN B. FIORETTA.

Witnesses:
 Bocco De Vito,
 Charles E. Ghiazza.

Copies of this patent may be obtained for five cents each, by addressing the "Commissioner of Patents, Washington, D. C."